UNITED STATES PATENT OFFICE.

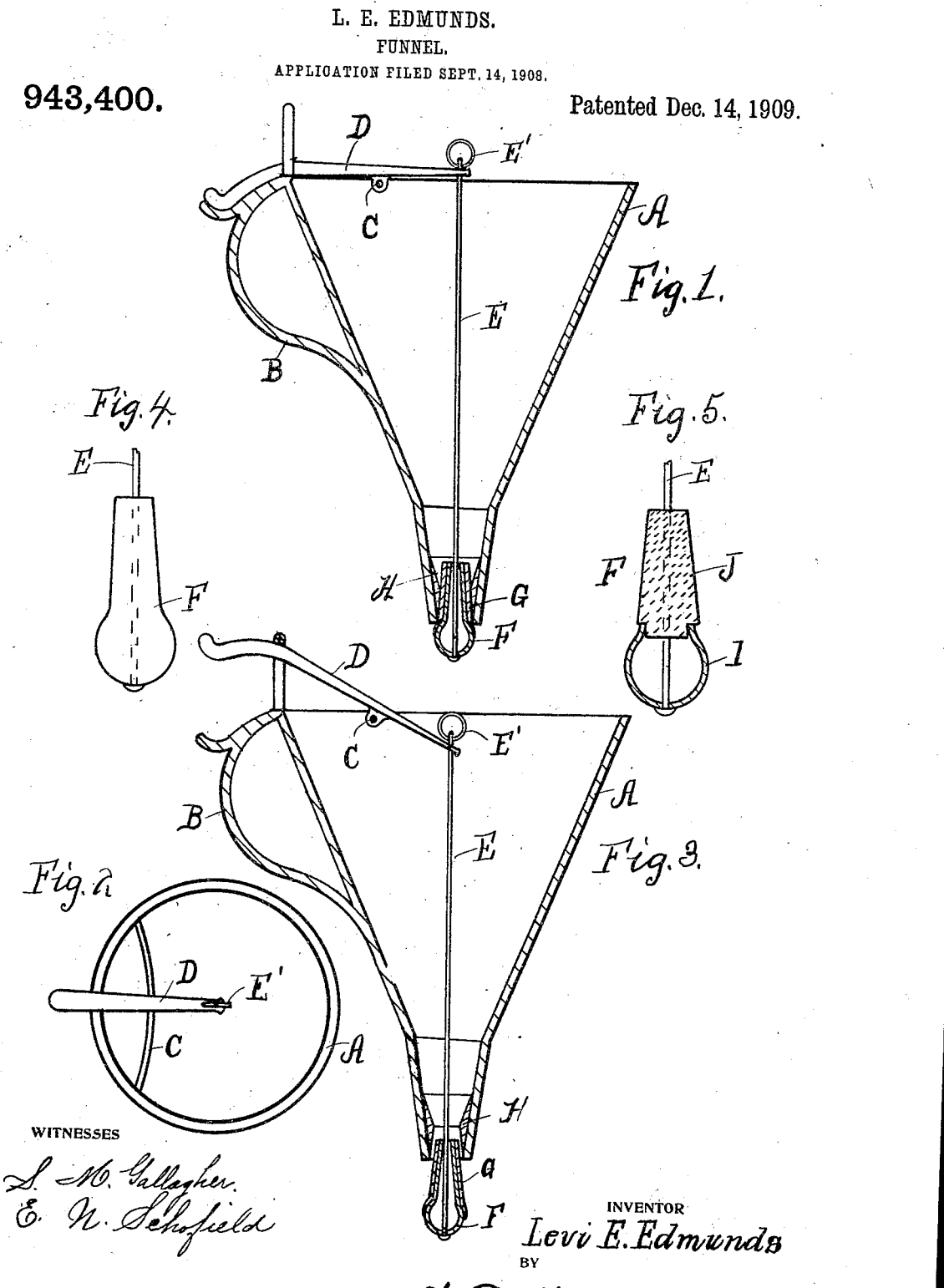

LEVI E. EDMUNDS, OF PHILADELPHIA, PENNSYLVANIA.

FUNNEL.

943,400. Specification of Letters Patent. Patented Dec. 14, 1909.

Application filed September 14, 1908. Serial No. 452,919.

*To all whom it may concern:*

Be it known that I, LEVI E. EDMUNDS, a citizen of the United States, residing at Philadelphia, county of Philadelphia, and State of Pennsylvania, have invented a certain new and useful Improvement in Funnels, of which the following is a specification.

My invention relates to new and useful improvements in funnels, and has for its object to provide an exceedingly simple and effective device of this character, whereby the outlet of the funnel may be closed following said funnel to be filled with a liquid and means for keeping the outlet of the funnel closed until such time as it is desired to discharge the liquid therefrom.

Another object of my invention is to provide a funnel in which a desired amount of liquid may be placed and held therein until it is to be placed into some other receptacle, thus overcoming the nuisance of spilling the liquid, when the inside of the receptacle into which the liquid is to be placed cannot be seen.

A still further object of my invention is to provide a device of this character whereby the liquid may be transmitted from the larger receptacle to a smaller one without spilling the liquid, or causing it to overflow from the smaller receptacle.

With these ends in view this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1, is a longitudinal sectional view of a funnel made in accordance with my improvement, the outlet being closed. Fig. 2, a plan view thereof. Fig. 3, a view similar to Fig. 1, showing the outlet open. Fig. 4, a side elevation of one of the stoppers used in my improvement. Fig. 5, a longitudinal sectional view of another form of stopper.

In carrying out my invention as here embodied, A represents a funnel, to which is attached a handle B so that the funnel may be readily held or carried from place to place and secured to the top of the funnel A is a bracket C to which is movably attached a lever handle D, the upper end of said lever handle adapted to extend beyond the inside of the funnel through the top of the handle B and rest in proximity to said handle. On the inner end of the lever handle D is fastened the end of the wire E, by passing said wire through the lever handle and securing to said wire the ring E' and on the lower end of the wire E is secured the stopper F. The stopper F is formed of hollow substantially pear shaped metal, around the upper portion of this is placed a cover G formed of an elastic material so that when the stopper is drawn up in the outlet of the funnel it will form a perfectly tight closure.

In practice the outer end of the lever handle D is pressed down, or the outer end of the lever handle may be of sufficient weight to counter balance the inner end thereof, the stopper and other attachments, which will bring the stopper F into the outlet of the funnel A thus forming a tight closure, allowing the liquid to be placed in the funnel so that it cannot spill out, it being understood that the funnel may be made of different sizes or they may be marked on the inside so that a person knows just what amount of liquid is in the funnel, when the desired amount of liquid has been placed in the funnel it may be carried to the receptacle into which it is to be placed without fear of spilling it. The funnel is then placed in the inlet of the receptacle and by letting go of the lever handle D the weight of the liquid will cause the stopper to be moved from the outlet of the funnel so that said liquid can then freely enter the receptacle into which it is to be placed. Should the receptacle into which the liquid is being placed be too small to receive all the liquid in the funnel the hollow stopper being very buoyant will float up on the liquid in the receptacle forcing the stopper into the outlet of the funnel thus automatically closing said outlet of the funnel, this will prevent the liquid from overflowing out of the receptacle. If found desirable an inner nozzle H made of rubber, wood or metal having a taper formed on the inside surface extending from either end inward thus causing the center portion thereof to be thicker than either end may be placed in the funnel outlet. The lower taper will allow a perfect closure to be made with the stopper and the upper taper will permit the liquid to flow freely through the funnel, and if a funnel is used on which there is no handle a portion of the outer end of the lever handle D may be dispensed with yet will have the same action as when using a funnel with a handle.

In Fig. 4 I have shown a modified form of stopper, said stopper being formed of wood, which may be hollow or not as desired, and the wire E is adapted to pass through this and be secured to the bottom thereof.

In Fig. 5 I have shown a still further modified form of stopper in which the metal portion I is in the shape of a bulb and in the opening thereof is secured the cork J the wire E passing through the center of this cork and through the metal bulb on the outside of which this is secured, it being understood that the elastic cover may be placed over this or not as the user may determine.

Of course I do not wish to be limited to the exact details of construction here shown as these may be varied within certain limits without departing from the spirit of my invention.

Having thus fully described my invention, what I claim as new and useful, is—

1. In combination with a funnel, a lever pivoted to the upper end thereof, a wire having one end passed through the inner end of the lever, a ring secured to said end of the wire, so as to abut the upper face of the lever, a hollow approximately pear-shaped member, the opposite end of said wire passing through said pear-shaped member, and having its extreme end headed to engage the outer face of the head of said pear-shaped member, and an annular elastic cover which surrounds said pear-shaped member and is disposed between the head and the inner end of the neck thereof.

2. In combination with a funnel, a lever pivoted to one end thereof, a wire passing through the funnel and having one end secured to the inner end of the lever, a pear-shaped member through which the opposite end of said wire passes, and is secured, and a hollow member secured on the interior of the funnel to coöperate with said pear-shaped member, said hollow member having its central inner surface enlarged and tapering toward each end thereof.

3. In combination with a funnel, a lever pivoted to one end thereof, a wire passing through the funnel and having one end secured to the inner end of the lever, a pear-shaped member to which the opposite end of the wire is connected, an elastic covering engaging about said pear-shaped member so as to extend throughout the length of the neck thereof and to extend partly over and onto the head, and a hollow member on the interior of the funnel shaped to conformably receive the pear-shaped member and to engage with the covering at the end thereof which extends onto the head of said pear-shaped member.

In testimony whereof, I have hereunto affixed my signature in the presence of two subscribing witnesses.

LEVI E. EDMUNDS.

Witnesses:
 FRANCIS BLOOMER,
 ALBERT E. EDMUNDS.